United States Patent [19]

Schoenherr

[11] Patent Number: 4,785,614
[45] Date of Patent: Nov. 22, 1988

[54] COMBINATION RAKE AND TEDDING APPARATUS

[75] Inventor: Theodore F. Schoenherr, Stratford, Wis.

[73] Assignee: H & S Manufacturing Co., Inc., Marshfield, Wis.

[21] Appl. No.: 6,817

[22] Filed: Jan. 22, 1987

[51] Int. Cl.⁴ ............................................. A01D 76/00
[52] U.S. Cl. ...................................... 56/365; 56/370; 56/372; 56/373; 56/366; 56/367; 56/368
[58] Field of Search .................. 56/365, 366, 367, 368, 56/369, 370, 372, 373, 377, 208

[56] References Cited

U.S. PATENT DOCUMENTS

| | | | |
|---|---|---|---|
| 2,810,253 | 10/1957 | Moore | 56/372 |
| 2,995,885 | 8/1961 | Van Der Lely et al. | 56/365 |
| 3,069,833 | 12/1962 | Van Der Lely | 56/377 |
| 3,548,572 | 12/1970 | Ferber | 56/208 |
| 4,685,282 | 8/1987 | Allen | 56/377 |

FOREIGN PATENT DOCUMENTS

| | | | |
|---|---|---|---|
| 1247445 | 10/1960 | France | 56/377 |
| 1439817 | 4/1966 | France | 56/377 |
| 1148796 | 4/1958 | Netherlands | 56/365 |
| 6413167 | 11/1964 | Netherlands | 56/372 |
| 0725728 | 3/1955 | United Kingdom | 56/377 |

Primary Examiner—Paul J. Hirsch
Assistant Examiner—J. M. Britt
Attorney, Agent, or Firm—Dorsey & Whitney

[57] ABSTRACT

An agricultural implement is disclosed for raking and tedding a swath of hay into a tedded windrow with a single pass of the implement along the swath of hay. The implement includes a plurality of circular rake wheels and a rotatable tedder, both mounted on a common base frame. First and second height adjustment mechanisms are included for the selective, independent adjustment of the height of the tedder and the height of the rake wheels. A lateral adjustment mechanism is provided for selectively adjusting the lateral relationship of the implement with respect to a towing vehicle.

23 Claims, 4 Drawing Sheets

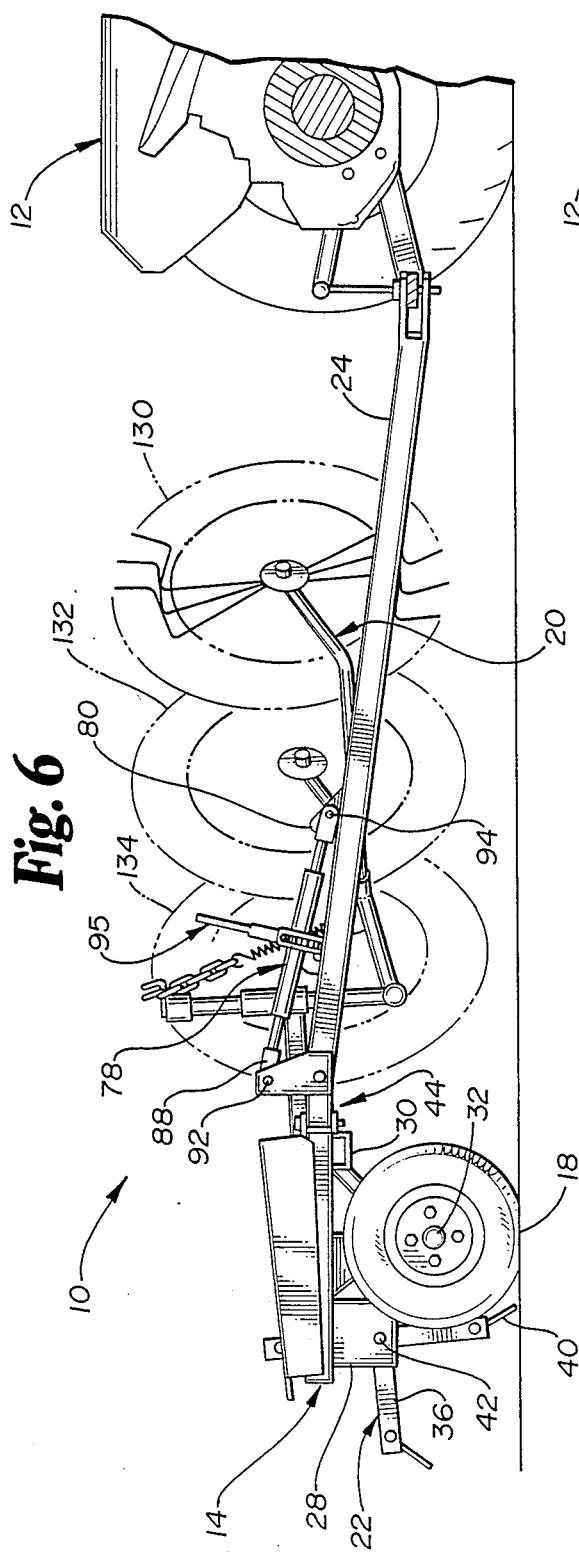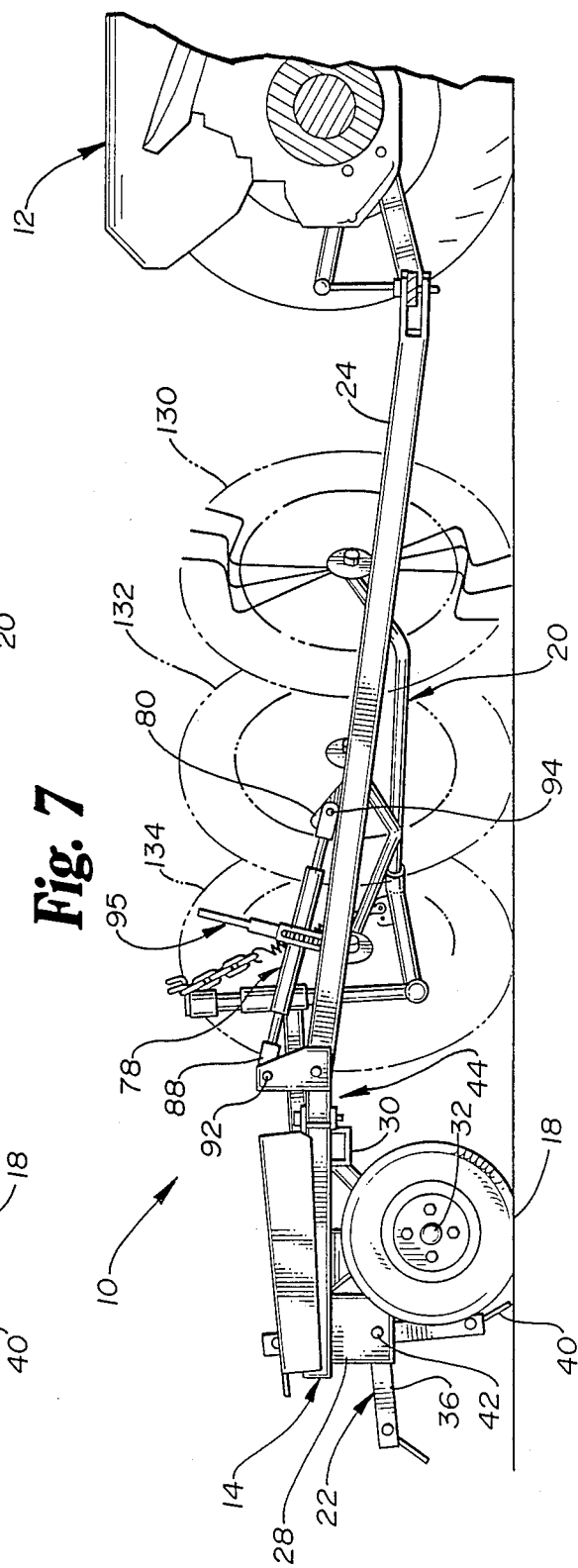

COMBINATION RAKE AND TEDDING APPARATUS

TECHNICAL FIELD

This invention pertains to the harvesting of hay or the like. In particular, an apparatus for raking and tedding a swath of hay into a tedded windrow, in a single pass of the apparatus along the swath of hay, is disclosed.

BACKGROUND OF THE INVENTION

A primary goal in the harvesting of hay is to dry the hay as soon as possible and remove it from direct exposure to sunlight. The hay must be dried before storage to avoid the problems of mold and spontaneous combustion. Exposing the cut hay to sunlight longer than is required to adequately dry it, however, results in unacceptable deterioration of the protein level (and therefore nutritive value) of the hay.

Typically, hay is harvested into approximately five foot swaths along the ground, and is exposed to sunlight for the initial stage of the drying process. The swaths of hay are then raked into a narrow windrow to remove most of the hay from direct contact with the moist ground. Preferably, the windrow is tedded to allow more air circulation within the windrow, thereby hastening the drying process.

It will be appreciated that both fuel consumption and time are doubled when two passes along the swath of hay are taken to first form the swath into a windrow and second ted the windrow. An apparatus that could rake a swath of hay into a windrow and ted the windrow, in a single pass along the swath of hay, would present decided advantages.

SUMMARY OF THE INVENTION

The present invention provides an apparatus for raking a swath of hay into a windrow, and tedding the windrow, in a single pass of the apparatus along the swath of hay. A set of circular rakes and a set of rotatable tedding tines are mounted on a common base frame. The base frame includes a first height adjustment mechanism for adjusting the height of the tedding tines relative to the ground and a second height adjustment mechanism for adjusting the height of the circular rakes independently of the height of the tedding mechanism. The apparatus includes a tow bar for operative connection of the frame to a self-propelled towing device. The tow bar includes a lateral adjustment mechanism so that the apparatus can be selectively, laterally shifted relative to the towing vehicle.

BRIEF DESCRIPTION OF THE DRAWINGS

FIG. 6 is a right side elevational view similar to FIG. 3 but with the tedder assembly lowered into operating position;

FIG. 7 is a right side elevational view similar to FIG. 6, but with the rake asssembly lowered into operating position.

DETAILED DESCRIPTION OF THE DRAWINGS

Figure 1:
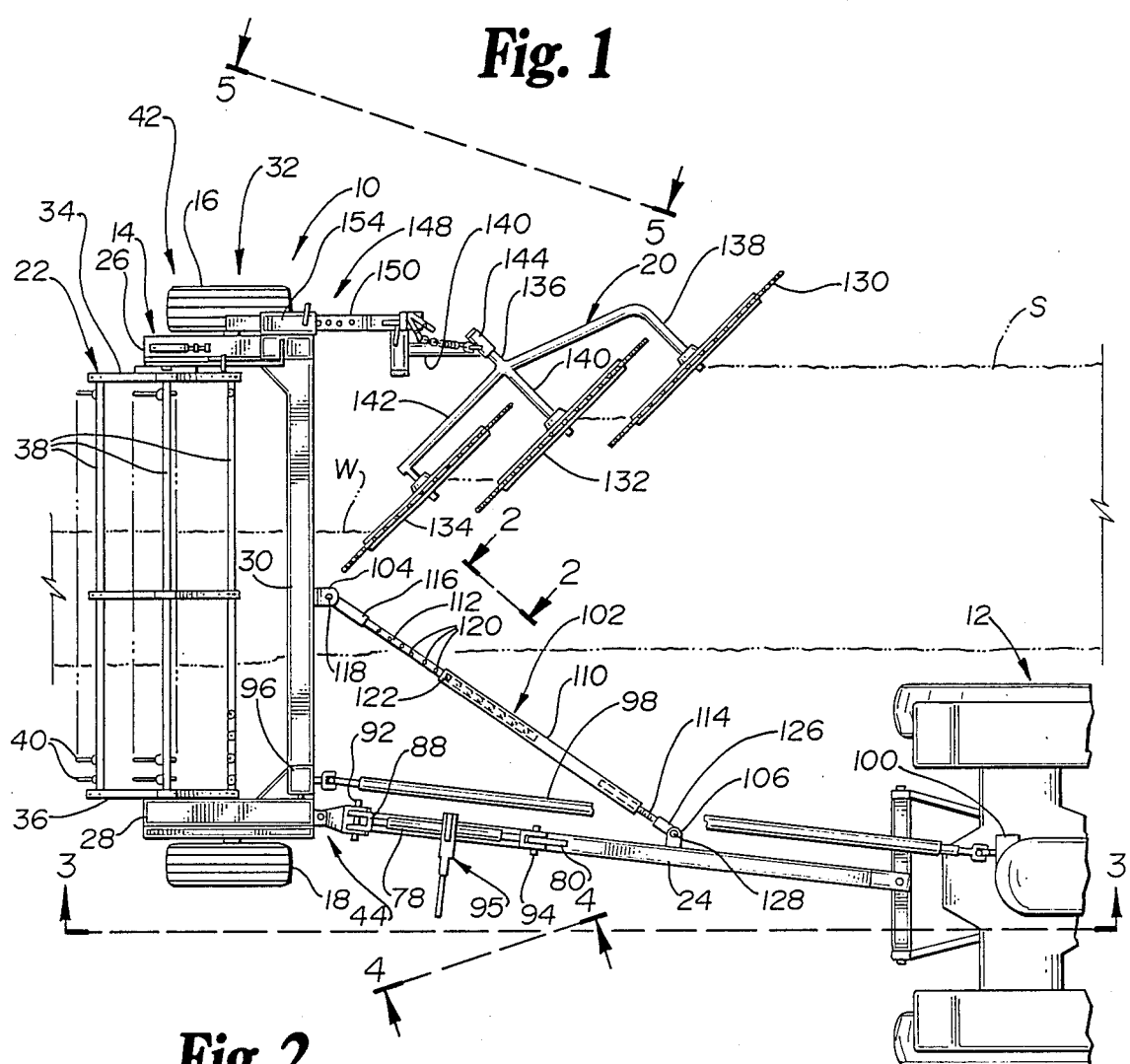
FIG. 1 is a plan view of the invention depicted in conjunction with a towing vehicle.
Figure 2:
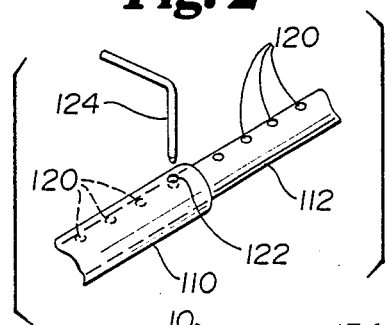
FIG. 2 is a fragmentary, perspective view taken at line 2—2 of FIG. 1.
Figure 3:
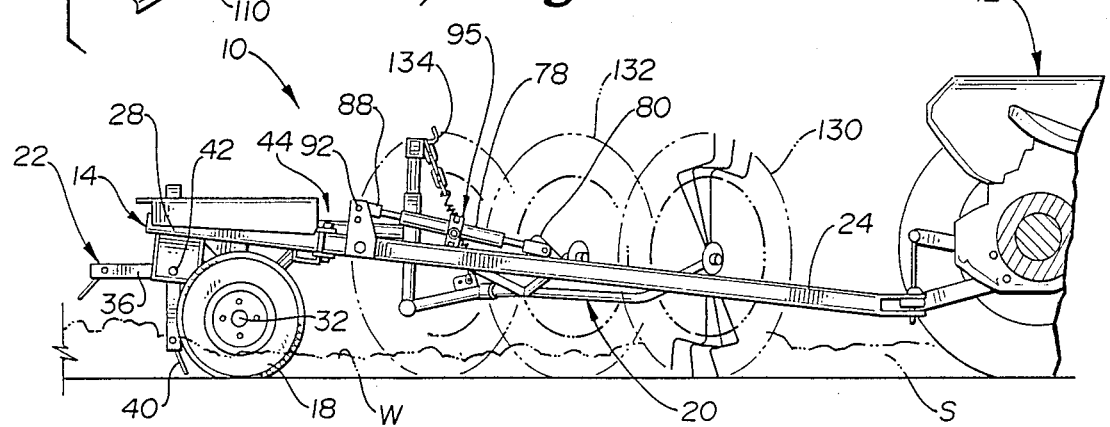
FIG. 3 is a right side elevational view of the invention.

Referring to the drawings, a combination rake and tedding apparatus 10 is depicted in a towed configuration behind a self-propelled vehicle such as tractor 12. The apparatus 10 broadly includes base frame 14 supported by ground engaging wheels 16, 18, rake assembly 20, tedding assembly 22, and a towing element comprising tow bar 24.

Base frame 14 includes opposed side frames 26, 28 interconnected by front brace 30. Wheels 16, 18 are rotatably supported on respective side frames 26, 28. Wheels 16, 18 together define a reference axis 32 about which the base frame 14 may be pivoted.

Tedding assembly 22 includes opposed spider wheels 34, 36 interconnected by tine support bars 38. Each tine support bar 38 includes a plurality of tines 40. Spider wheels 34, 36 define a tedding axis 42 about which the spider wheels, support bars 38, and tines 40 mutually rotate.

Figure 4:
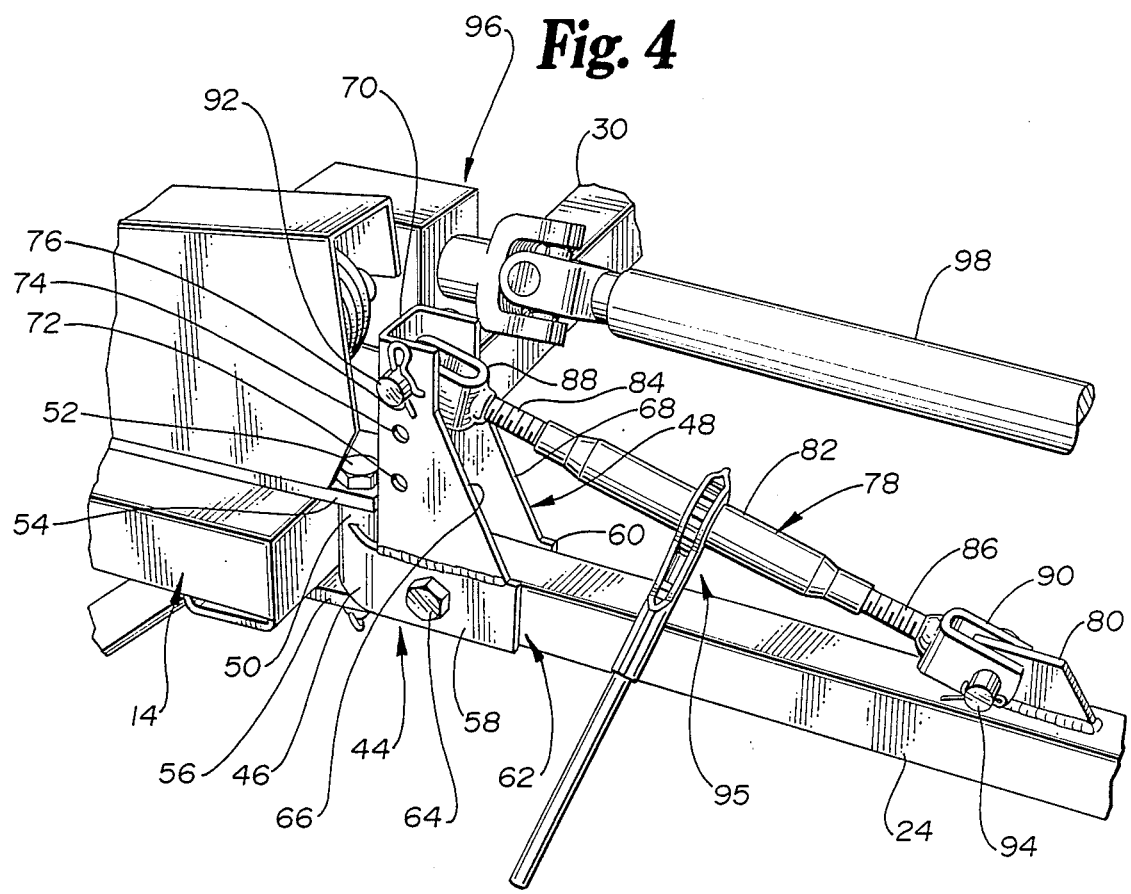
FIG. 4 is a fragmentary, perspective view taken at line 4—4 of FIG. 1.

Tow bar 24 is pivotally coupled to base frame 14 by tow bar coupling assembly 44. As best shown in FIG. 4, tow bar coupling assembly 44 includes U-shaped attachment bracket 46 and turnbuckle support structure 48. The curvilinear portion of the U-shaped bracket 46 includes sleeve 50. Attachment bolt 52 is received through base frame clevis arms 54, 56 and sleeve 50 for coupling U-shaped bracket 46 to base frame 14 in side to side pivoting relationship.

Arms 58, 60 of U-shaped bracket 46 form a tow bar receiving clevis 62. Tow bar 24 is retained within clevis 62 by pivot pin 64 in up and down pivoting relationship. Turnbuckle support structure 48 comprises spaced apart plates 66, 68 extending upwardly from respective arms 58, 60 of U-shaped bracket 46. The turnbuckle support structure plates 66, 68 are rigidly connected by the back plate 70, and include opposed pairs of attachment point apertures 72, 74, 76.

Turnbuckle 78 extends between the turnbuckle support structure 48 of tow bar coupling assembly 44 and attachment tongue 80 extending upwardly from tow bar 24. Turnbuckle 78 includes internally threaded sleeve 82 and opposed, oppositely, externally threaded rods 84, 86, respectively terminating at clevis ends 88, 90. Turnbuckle clevis end 88 is pivotally coupled to turnbuckle support structure 48 at a selected one of the turnbuckle attachment point aperture pairs 72, 74, 76 by pivot pin 92. Turnbuckle clevis end 90 is pivotally coupled to attachment tongue 80 by pivot pin 94. Ratchet assembly 95 is permanently attached to turnbuckle sleeve 82.

Power takeoff coupling 96 is mounted on front brace 30 of base frame 14. Power takeoff rod 98 extends from the coupling 96 to a power takeoff coupling 100 on tractor 12.

As best depicted in FIG. 1, lateral adjustment, telescoping brace 102 extends between a clevis 104 mounted at the approximate midpoint of base frame front brace 30 to a second clevis 106 mounted on the tow bar 24. The brace 102 includes brace tube 110, coarse adjustment brace bar 112, and fine adjustment rod 114. The brace bar 112 is shiftably received within brace tube 110, and includes attachment element 116 pivotally coupled to clevis 104 by pivot pin 118, for side to side pivoting motion. The brace bar 112 includes a plurality of apertures 120. The brace tube 110 includes a pair of diametrically opposed apertures 122 for selective alignment with brace bar apertures 120. Securing pin 124 is received through brace tube apertures 122 and a selected one of the brace bar apertures 120. The end of brace tube 110 opposed to the end within which brace bar 112 is received is internally threaded. Fine adjustment rod 114 is externally threaded, and is threadably received within the brace tube 110. Fine adjustment rod 114 terminates at its external end in adjustment rod coupling 126. Adjustment rod coupling rod 126 is pivotally attached to tow bar clevis 106 by pivot pin 128.

Figure 5:
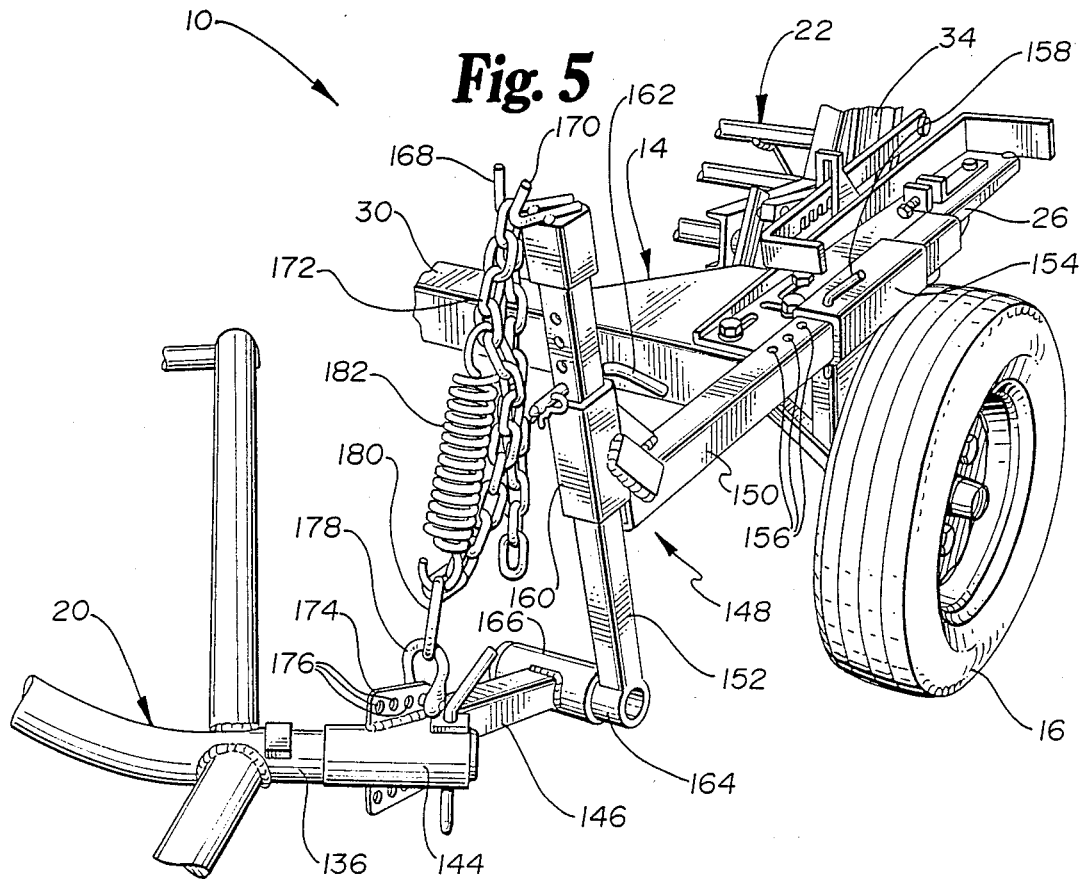
FIG. 5 is a fragmentary, perspective view taken at line 5—5 of FIG. 1.

A first embodiment of rake assembly 20 is depicted in FIG. 1 and FIG. 5. Rake assembly 20 includes rake wheels 130, 132, 134 supported on a common mounting spindle 136 by respective rake wheel support elements 138, 140, 142. Rake wheel support spindle 136 is received within sleeve 144 of rake wheel support arm 146. Rake wheel support arm 146 is pivotally supported on attachment assembly 148.

Attachment assembly 148 includes horizontal support rod 150 and vertical support rod 152. Horizontal support rod 150 is shiftably, detachably received within base frame sleeve 154. Horizontal support rod 150 includes a plurality of apertures 156 along the length thereof. Locking pin 158 is received through sleeve 154 and a selected one of horizontal support rod apertures 156. Vertical sleeve 160 is fixedly carried by horizontal support rod 150. Vertical support rod 152 is shiftably received within vertical sleeve 160. Attachment pin 162 is carried by a selected one of a plurality of apertures 164 extending through vertical support rod 152 for positioning vertical support rod 152 within vertical sleeve 160.

Pivot spindle 164 is carried by vertical support rod 152 at its lowermost end. Rake wheel support arm 146 includes sleeve 166 pivotally carried by the spindle 164. Attachment hooks 168, 170 are carried by the vertical support rod 152 at its uppermost end. Chain 172 extends from one of the attachment hooks 168, 170 to attachment plate 174 carried by rake wheel support 146. Attachment plate 174 includes a plurality of attachment apertures 176. Chain 172 is selectively coupled to attachment plate 174 at a selected one of the apertures 176 by anchor clevis 178 and attachment link 180. Spring 182 extends between attachment link 180 and a selected link of chain 172.

Figure 8:
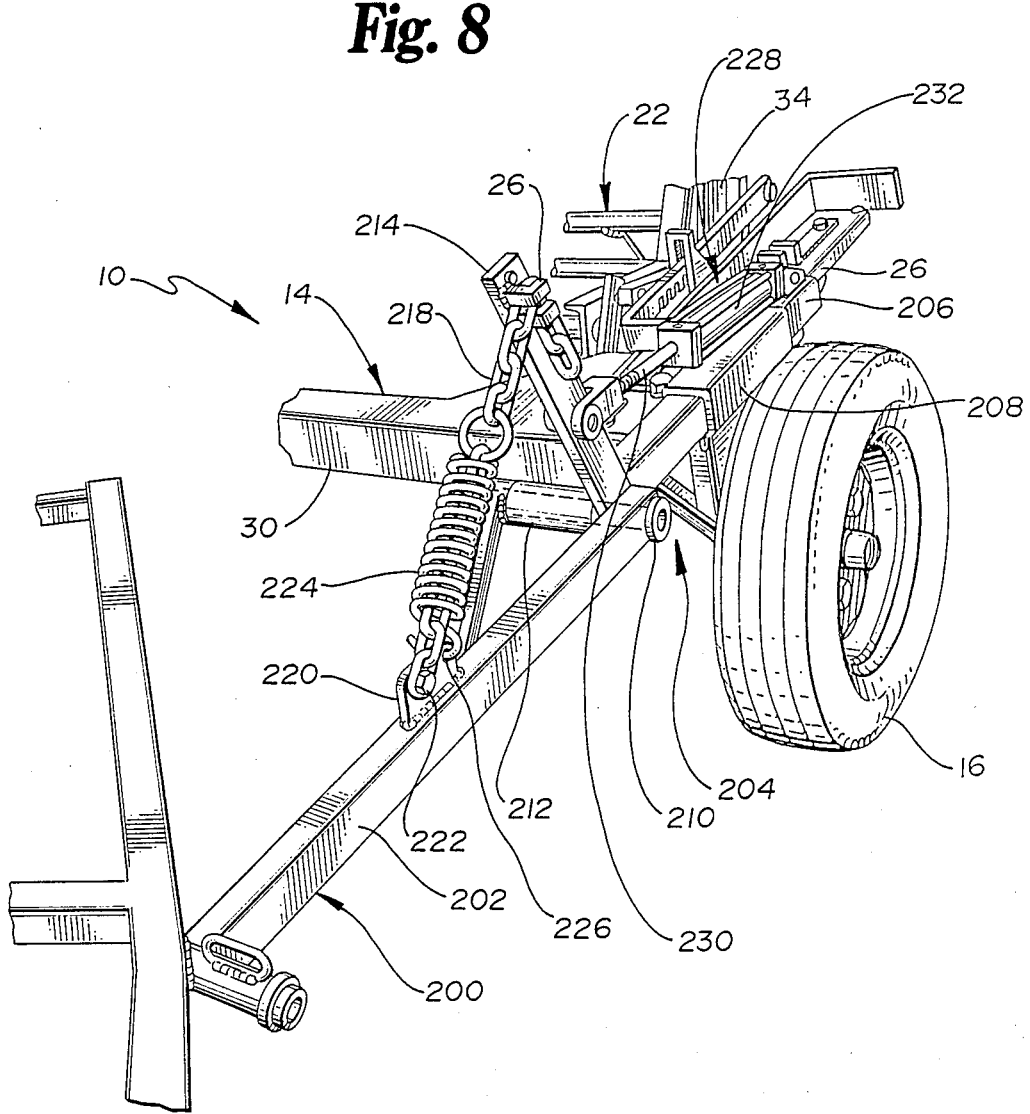
FIG. 8 is a fragmentary, perspective view similar to that of FIG. 5, but showing an alternative embodiment.

Referring to FIG. 8, a second embodiment of a rake assembly 200 is depicted. Rake assembly 200 includes rake wheels (not shown) supported on rake wheel support elements similar to those described in conjunction with rake assembly 20. The rake wheel support elements are carried by a rake wheel support arm 202. Rake wheel support arm 202 is removably coupled to base frame 14 by attachment assembly 204. Attachment assembly 204 comprises horizontal rod 206 shiftably, detachably received within base frame sleeve 208. The rake wheel support arm 202 is pivotally coupled to horizontal rod 206 by pivot pin 210. Pivot pin 210 is received through a pivot sleeve 212 carried by the horizontal rod 206.

Lift lever 214 is pivotally supported at its lower end by pivot pin 210. The uppermost end of lift lever 214 includes attachment hook 216. Chain 218 extends from attachment hook 216 to an attachment plate 220 fixedly secured to rake wheel support arm 202. The chain 218 is secured to attachment plate 220 by bolt 222. Spring 224 extends from aperture 226 in plate 220 to a selected one of the links of chain 218.

Hydraulically actuated piston and cylinder assembly 228 extends between lift lever 214 and base frame 14. The rod 230 of piston and cylinder assembly 228 is pivotally coupled to lift lever 214 at a point between the lever's upper and lower ends. The cylinder 232 of piston and cylinder assembly 228 is pivotally coupled to the base frame 14.

In operation, the tow bar 24 of combination rake and tedding apparatus 10 is attached to a tractor 12 for towing of rake and tedding apparatus 10 along a swath of hay or the like (S). The power takeoff rod 98 is coupled to the power takeoff coupling 100 of the tractor 12, for powered rotation of the tedding assembly 22.

The lateral orientation of the rake and tedding apparatus 10 relative to the tractor 12 is determined by adjusting the length of telescoping brace 102. The length of the telescoping brace 102 is adjusted by rotating the brace tube 110 about the fine adjustment rod 114, and by the selection of an appropriate one of the brace bar apertures 120 to be aligned with the brace tube aperture pair 122. Brace pin 124 is inserted to lock the position of the brace bar 112 relative to the brace bar 110.

The height of the tedding assembly 22 is preferably high enough so that the tines 40 of the tedding assembly 22 do not contact the ground at the lowermost point of their circular path of travel. The tedding assembly should be low enough, however, so that the tines 40 interact with most of the hay as the tedding assembly is passed along the hay windrow. Adjustment of the height of the tedding assembly 22 is accomplished by pivoting the base frame 14 about the reference axis 32 defined by the wheels 16, 18. In this regard, the tow bar 24 serves as a reference member for selective pivoting of the base frame about a pivot axis defined by pivot pin 64. Pivoting of the base frame 14 about pivot pin 64 is accomplished by adjusting the length of turnbuckle 78. As the length of the turnbuckle 78 is shortened, the base frame pivots forwardly, raising the tedding assembly 22. The opposite occurs as the length of the turnbuckle 78 is extended.

It will be appreciated that pivoting of the base frame 14 will affect the height of the rake assembly 20 and 200, as well as adjusting the height of the tedding assembly 22. Second height adjustment means are therefore provided so that the height of the rake assembly can be adjusted independently of the height of the tedding assembly 22. Proper operation of the rake wheels 130, 132, 134 requires that the wheels be in contact with the ground so that they will rotate and form the swath of hay (S) into a windrow (W). Referring to FIG. 5, the height of the rake assembly 20, and in particular of the rake wheels 130, 132, 134, can be adjusted in the first instance by selective positioning of the vertical support rod 152 within vertical sleeve 160, by insertion of pin 158 in a selected one of the horizontal support rod apertures 156. Moreover, chain 172 acts as an adjustable tension member for supporting the rake wheel support arm 146. The angle between rake wheel support arm 146 and vertical support rod 152, and therefore the height of the rake wheels 130, 132, 134, can be adjusted by appropriate selection of the attachment plate aperture 176 to which the anchor clevis 178 is attached. The angle of the rake wheel support arm 146 relative to the vertical support rod 152 can also be adjusted by selecting an appropriate link of chain 172 to hook on attachment hooks 168, 170. Again referring to FIG. 5, the rake wheel support arm 146 can be resiliently mounted by attaching frame 182 to an appropriate link of chain 172 such that a slack portion of chain is created between the two ends of spring 182.

Referring to FIG. 8, the height of rake assembly 200 can likewise be adjusted several ways. The rake wheel support arm 202 can be pivoted about pivot pin 210 by adjusting the length of chain 218 through the attachment of a selected link of the chain 218 to attachment hook 216. The rake wheel support arm 202 can be resiliently mounted by attaching spring 224 to an appropriate length of the link chain 218 so as to create slack in the chain 218 between the two ends of the spring 224. The rake wheel support arm 202 can also be pivoted about pivot pin 210 by the extension and retraction of the piston and cylinder assembly 228.

I claim:

1. An agricultural implement adapted for being towed by a tractor or the like along a path of travel relative to a swath of hay or the like. comprising:
   a base frame adapted for towing behind said tractor or the like;
   a pair of opposed, ground engaging wheels aligned along a base frame support axis operably supporting said base frame about said axis for movement of said base frame along said path of travel;
   rake means operably coupled to said base frame for forming said swath of hay into a windrow;
   tedding means operably coupled to said base frame rearwardly of said rake means for tedding said windrow;
   tow means adapted for operably, detachably coupling said base frame to said tractor or the like, said tow means including means for laterally shifting said base frame relative to said tractor or the like;
   first height adjustment means operably coupling said tow means and said base frame for selectively pivoting said base frame about said base frame axis, thereby selectively adjusting the height of said tedding means relative to the ground; and
   second height adjustment means operably coupling said rake means and said base frame for adjusting the height of said rake means independently of the height of said tedding means.

2. The invention of claim 1, said tow means being operably, pivotally coupled to said base frame at a pivot point, said first height adjustment means comprising a selectively extensible elongated member having first and second opposed ends, said first end of said elongated member being pivotally, operably coupled to said tow means, said first height adjustment means further including attachment structure operably coupled to said base frame and defining an elongated member attachment point spaced apart from said pivot point, said second end of said elongated member being pivotally, operably coupled to said attachment point, and adjustment means operably coupled to said elongated member for selectively adjusting the length of said elongated member.

3. The invention of claim 1, said tow means being operably, pivotally coupled to said base frame at a pivot point, said first height adjustment means comprising an elongated member having first and second opposed ends, said first end of said elongated member being pivotally, operably coupled to said tow means, said first height adjustment means further including attachment structure operably coupled to said base frame and defining a plurality of elongated member attachment points spaced apart from said pivot point, and adjustment means for selectively, operably coupling said second end of said elongated member to one of said attachment points.

4. The invention as claimed in claim 2, said tedding means being oriented rearwardly of said base frame support axis, and said attachment point being oriented above said pivot point.

5. The invention of claim 3, said tedding means being oriented rearwardly of said base frame support axis, and said attachment points being oriented above said pivot point.

6. The invention of claim 2, said attachment structure defining a plurality of elongated member attachment points, said adjustment means including means for selectively attaching said elongated member to a predetermined one of said attachment points.

7. The invention of claim 2, said elongated member comprising a turnbuckle, said adjustment means including a rachet spanner operably coupled to said turnbuckle.

8. The invention of claim 1, said rake means including a rake element and a rake support arm operably, pivotally coupling said rake element to said base frame about a rake support arm pivot point, said second height adjustment means comprising means for pivoting said rake support arm about said rake support arm pivot point.

9. The invention of claim 8, said rake means including suspension means for resiliently supporting said rake support element relative to said base frame.

10. An agricultural implement adapted for passing along a path of travel relative to a swath of hay or the like, comprising:
    a base frame;
    ground engaging wheels operably supporting said base frame for movement of said base frame along said path of travel;
    rake means operably coupled to said base frame for forming said swath of hay into a windrow, said rake means including a rake element and a rake support arm operably, pivotally coupling said rake element to said base frame about a rake support arm pivot point;
    tedding means operably coupled to said base frame rearwardly of said rake means for tedding said windrow, whereby said swath of hay or the like is formed into a windrow, and said windrow is tedded, in a single pass of said implement along said path of travel;
    first height adjustment means operably coupled to said base frame for selective adjustment of the height of said tedding means; and
    second height adjustment means operably coupled to said base frame for selective adjustment of the height of said rake means independently of the height of said tedding means,
    said second height adjustment means comprising means for pivoting said rake support arm about said rake support arm pivot point, said second height adjustment means further comprising a selectively extensible second height adjustment elongated member having first and second opposed ends, said first end of said second height adjustment elongated member being operably, pivotally coupled to said base frame, and the second end of said second height adjustment elongated member being operably, pivotally coupled to said rake support arm at a point spaced apart from said rake support arm pivot point, and means for selectively adjusting the length of said second height adjustment elongated member.

11. The invention of claim 10, including a lift lever pivotally mounted about said rake support arm pivot point, and operably coupled to said second height adjustment elongated member, and a tension bearing member extending from first attachment point spaced apart from said rake support arm pivot point on said lift lever, to a second attachment point presented by said rake support arm, said second attachment point spaced apart from said rake support arm pivot point.

12. The invention of claim 11, said second height adjustment means including means for adjusting the length of said tension bearing member.

13. The invention of claim 12, said tension bearing member including suspension means for resiliently supporting said rake support arm.

14. The invention of claim 8, including support structure operably coupled to said base frame, and presenting a support structure attachment point spaced apart from said rake support arm pivot point, and a tension bearing member extending from said support structure attachment point to a rake support arm attachment point presented by said rake support arm, said rake support arm attachment point being spaced apart from said rake support arm pivot point.

15. The invention of claim 14, said second height adjustment means including means for adjusting the length of said tension bearing member.

16. The invention of claim 14 or 15, said tension bearing member including suspension means for resiliently supporting said rake support arm.

17. The invention of claim 14 or 15, said rake support arm presenting a plurality of rake support arm attachment points, each of said rake support arm attachment points being spaced apart from said rake support arm pivot point respective, different distances, said second height adjustment means including means for selectively attaching said tension bearing member to a selected one of said rake support arm attachment points.

18. The invention of claim 8, said second height adjustment means including means for selectively shifting the elevation of said rake support arm pivot point relative to said base frame.

19. The invention of claim 1 said means for laterally shifting said base frame including lateral adjustment means operably coupled to said base frame and said tow means for selective adjustment of the lateral orientation of said implement relative to said tractor or the like.

20. The invention of claim 19, said lateral adjustment means comprising a telescoping brace extending between said base frame and said towing element.

21. The invention of claim 20, said telescoping brace including coarse and fine adjustment mechanisms for selectively adjusting the length of said brace.

22. The invention of claim 21, said brace including a brace tube having a pair of opposed tube apertures at one end thereof, said coarse adjustment means comprising a brace rod shiftably received within said tube, said rod including structure defining a plurality of rod apertures along the length thereof, and a securing element received through said tube apertures and a selected one of said rod apertures, for selectively setting the length of said telescoping brace.

23. The invention of claim 22, said brace tube being internally threaded at the opposed end thereof, said fine adjustment mechanism comprising an externally threaded rod threadably received within said internally threaded end of said brace tube.

* * * * *